United States Patent Office 2,937,203
Patented May 17, 1960

2,937,203

N-TERTIARY-ALKYL AMIDES OF TEREPHTHALIC, ISOPHTHALIC, AND TRIMESIC ACIDS

Mack F. Fuller, Woodbury, N.J., assignor to E. I. du Pont de Nemours and Company, Wilmington, Del., a corporation of Delaware No Drawing. Application September 27, 1957
Serial No. 686,576

8 Claims. (Cl. 260—558)

The present invention relates to new N-substituted amides of certain monocyclic polycarboxylic aromatic acids. More particularly the present invention relates to new N-substituted tertiary-alkyl amides of terephthalic, isophthalic and trimesic acids.

The new compounds of the present invention may be represented by the following formula:

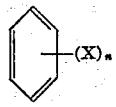

wherein "X" stands for the monovalent radical

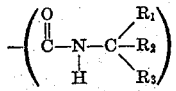

"n" is either 2 or 3 provided that no two "X" radicals are in adjacent positions on the benzene ring; and each of $R_1$, $R_2$, and $R_3$ represented saturated alkyl groups of from 1 to 19 carbon atoms, the sum of the carbon atoms in the $R_1$, $R_2$, and $R_3$ groups of any single "X" radical being not less than 10 nor more than 21.

It is an object of the present invention to prepare new N-substituted tertiary-alkyl amides of the aforementioned type. It is a further object of the present invention to prepare these new compounds by a convenient and economical process. Other and additional objects will become apparent from a consideration of the ensuing specification and claims.

The new compounds of the present invention may be prepared by reacting an acid halide, such as the acid chloride, of terephthalic, isophthalic, or trimesic acid with a saturated tertiary-alkyl primary amine having from 11 to 22 carbon atoms, or with a mixture of such amines. An acid acceptor is used for the hydrogen chloride which is evolved in the course of the reaction. Such compounds as sodium carbonate, if an aqueous organic reaction medium is used, or a tertiary amine, such as pyridine, triethyl amine, or even an excess of the tertiary-alkyl primary amine reactant, if a non-aqueous reaction medium is used, are quite suitable.

The invention will be better understood from a consideration of the following examples.

Example 1

11.5 grams (0.06 mole equivalent) of "Primene" 81–R, 6.4 g. of sodium carbonate, 150 cc. of water, and 100 cc. of methylene chloride are stirred in a Waring Blendor until the sodium carbonate dissolves. A solution of 6.2 g. (0.03 mole) of terephthaloyl chloride (98% purity) in 50 cc. of methylene chloride is added to the Waring Blendor. Agitation is continued for 7 minutes after addition of the terephthaloyl chloride is completed. The reaction mixture is poured into a one-liter beaker containing 200 g. of distilled water. This mixture is heated on a steam bath until the methylene chloride is completely evaporated. The solid product is filtered, washed once with distilled water in the Waring Blendor, once with water acidified to a pH of 3 with HCl, and several additional times with distilled water until the wash water is free of the chloride ion. The product is dried for two hours in an oven at 100° C.

"Primene" 81–R is a mixture of tertiary-alkyl primary amines manufactured by the Rohm and Haas Company, Inc., and composed principally of amines ranging from $t$-$C_{11}H_{23}NH_2$ to $t$-$C_{14}H_{29}NH_2$ and including a small percentage of about 7.5% by weight of higher tertiary alkyl amines in the $t$-$C_{15}H_{31}NH_2$ to $t$-$C_{20}H_{41}NH_2$ range. This mixture has the following properties:

Molecular weight—171–213
Neutral equivalent—191
Boiling range (760 mm.)—5–90% at 223–240° C.
Sp. gr. (25° C.)—0.812
Refractive index (25° C.)—1.423
Color—50 (APHA)
Flash point (Tag, open cup)—205° F.

The final product is a mixture of N,N'-substituted tertiary-alkyl terephthalamides. It is a white solid of slight, but pleasant, odor which melts at 160–165° C. and contains 5.58% nitrogen by Dumas determination. It is soluble at room temperature to at least about 10% by weight in mineral spirits, benzene, xylene, chloroform, tetrahydrofuran, nitrocyclohexane, dimethylformamide, decyl alcohol, butyl acetate, absolute ethanol, butanol, methylethylketone, cyclohexane, and many other common organic solvents. It is soluble in mineral spirits (a petroleum distillate, 90% of which boils below 200° C. and which has a flash point of 86°–105° F., a specific gravity of 0.770–0.800, and a refractive index of 1.42) to the extent of greater than 50% by weight. A 50% solution in mineral spirits has a viscosity in excess of 2000 cp. at 25° C.

Example 2

The procedure of Example 1 is repeated through evaporation of the methylene chloride, substituting 18.9 g. of "Primene" JM–T for the "Primene" 81–R. The plastic product is dissolved in benzene. The benzene solution is washed first with distilled water, then with HCl-acidified water, and once more with distilled water until the wash water shows a negative test for the chloride ion with silver nitrate. The benzene solution is dried over anhydrous sodium sulfate and filtered. The benzene is removed from the product at reduced pressure.

"Primene" JM–T is a mixture of tertiary-alkyl primary amines manufactured by the Rohm and Haas Company, Inc. and ranging principally from $t$-$C_{18}H_{37}NH_2$ to $t$-$C_{22}H_{45}NH_2$ but containing a small fraction of about 10 to 12% by weight of lower molecular weight tertiary alkyl amines composed primarily of $t$-$C_{15}H_{31}NH_2$ to $t$-$C_{17}H_{35}NH_2$ amines. This mixture has the following properties:

Molecular weight—269–325
Neutral equivalent—315
Boiling range (760 mm.)—5–70% at 265–308° C.
Sp. gr. (25° C.)—0.840
Refractive index (25° C.)—1.456
Color—11 (varnish scale)
Flash point (Tag, open cup)—265° F.

The final product is a mixture of N,N'-substituted tertiary-alkyl terephthalamides. It is a light amber-colored plastic at room temperature and has a very mild odor. If heated on a Fisher-Johns melting point apparatus, the product flows at 60–70° C. It contains 3.64% $N_2$ by Dumas determination. It is highly soluble in a wide variety of organic solvents, including aliphatic and aromatic hydrocarbons, alcohols, ethers, ketones, esters, etc.

*Example 3*

The procedure of Example 1 is repeated except that a mixture composed of 9.4 g. (0.03 mole equivalent) of "Primene" JM–T and 5.8 g. (0.03 mole equivalent) of "Primene" 81–R is used in lieu of the 11.5 g. of "Primene" 81–R.

The purified product is a mixture of N,N'-substituted tertiary-alkyl terephthalamides. It is a light yellow solid which shows an apparent melting point on the Fisher-Johns apparatus of 90–95° C. If heated in a test tube, the product is completely molten at 115° C. As the melt is cooled, it begins to solidify at 80° C. and is completely solidified at 60° C. The product contains 4.37% $N_2$ by Kjeldahl determination.

*Example 4*

The procedure of Example 1 is repeated except that 6.2 g. (0.03 mole) of isophthaloyl chloride is substituted for the 6.2 g. of terephthaloyl chloride.

The product is a mixture of N,N'-substituted tertiary-alkyl isophthalamides. It is a hard white solid melting at 110–115° C. It contains 5.55% $N_2$ by Kjeldahl determination. The solubility properties of the product are extremely similar to the corresponding properties of the product in Example 1.

*Example 5*

The procedure of Example 1 is repeated substituting 0.06 mole equivalent (10.3 grams) of 2,2,3,4,4-pentamethyl-3-amino-hexane for the "Primene" 81–R. The final product is N,N'-bis 3(2,2,3,4,4-pentamethyl-hexyl) terephthalamide, a white solid having solubility properties extremely similar to those of the product in Example 1.

*Example 6*

The procedure of Example 2 is repeated substituting 0.06 mole equivalent (17.8 grams) of 11-methyl-11-amino-nondecane for the "Primene" 81–R. The final product is N,N'-bis 9(9-methyl-nondecyl) terephthalamide, a plastic solid having solubility properties extremely similar to those of the product in Example 2.

*Example 7*

The procedure of Example 1 is repeated substituting 0.6 mole equivalent (11.1 grams) of 2,2,3,4-tetramethyl-4-ethyl-3-amino-hexane for the "Primene" 81–R. The final product is N,N'-bis 3(2,2,3,4-tetramethyl-4-ethylhexyl) terephthalamide, a white solid having solubility properties extremely similar to those of the product in Example 1.

*Example 8*

The procedure of Example 1 is repeated substituting 0.06 mole equivalent (10.3 grams) of 3,5-dimethyl-5-ethyl-3-amino-heptane for the "Primene" 81-R. The final product is N,N'-bis 3(3,5-dimethyl-5-ethyl-hexyl) terephthalamide, a white solid having solubility properties extremely similar to those of the product in Example 1.

*Example 9*

The procedure of Example 2 is repeated substituting 0.06 mole equivalent (19.5 grams) of 8-heptyl-8-amino-pentadecane for the "Primene" 81–R. The final product is N,N'-bis 8(8-heptyl-pentadecyl) terephthalamide, a plastic solid having solubility properties extremely similar to those of the product in Example 2.

*Example 10*

The procedure of Example 1 is repeated substituting 0.06 mole equivalent (11.1 grams) of 5-methyl-5-amino-undecane for the "Primene" 81–R. The final product is N,N'-bis 5(5-methyl-undecyl) terephthalamide, a white solid having solubility properties extremely similar to those of the product in Example 1.

*Example 11*

The procedure of Example 2 is repeated substituting 0.06 mole equivalent (19.5 grams) of 4-propyl-4-amino-nondecane for the "Primene" 81–R. The final product is N,N'-bis 4(4-propyl-nondecyl terephthalamide, a plastic solid having solubility properties extremely similar to those of the product in Example 2.

*Example 12*

The procedure of Example 1 is repeated substituting 0.06 mole equivalent (16.1 grams) of 3,3,7,11,11-pentamethyl-7-amino-tridecane for the "Primene" 81–R. The final product is N,N'-bis 7(3,3,7,11,11-pentamethyl-tridecyl) terephthalamide, a white solid having solubility properties extremely similar to those of the product in Example 1.

*Example 13*

The procedure of Example 1 is repeated substituting 0.06 mole equivalent (11.1 grams) of 2,3-dimethyl-2-amino-decane for the "Primene" 81–R. The final product is N,N'-bis 2(2,3-dimethyl-decyl) terephthalamide, a white solid having solubility properties extremely similar to those of the product in Example 1.

*Example 14*

The prodecure of Example 1 is repeated substituting 0.06 mole equivalent (16.1 grams) of 2-methyl-2-amino-heptadecane for the "Primene" 81–R. The final product is N,N'-bis 2(2-methyl-heptadecyl) terephthalamide, a white solid having solubility properties extremely similar to those of the product in Example 1.

*Example 15*

The procedure of Example 1 is repeated substituting 6.2 grams (0.03 mole) of isophthaloyl chloride for the terephthaloyl chloride and 0.06 mole equivalent (10.3 grams) of 2,2,3,4,4-pentamethyl-3-amino-hexane for the "Primene" 81–R. The final product is N,N'-bis 3(2,2,3,4,4-pentamethyl-hexyl) isophthalamide, a white solid having solubility properties extremely similar to those of the product in Example 1.

*Example 16*

The procedure of Example 2 is repeated substituting 6.2 grams (0.03 mole) of isophthaloyl chloride for the terephthaloyl chloride and 0.06 mole equivalent (17.8 grams) of 11-methyl-11-amino-nondecane for the "Primene" 81–R. The final product is N,N'-bis 9(9-methyl-nondecyl) isophthalamide, a plastic solid having solubility properties extremely similar to those of the product in Example 2.

*Example 17*

The procedure of Example 1 is repeated substituting 6.2 grams (0.03 mole) of isophthaloyl chloride for the terephthaloyl chloride and 0.06 mole equivalent (11.1 grams) of 2,2,3,4-tetramethyl-4-ethyl-3-amino-hexane for the "Primene" 81–R. The final product is N,N'-bis 3(2,2,3,4-tetramethyl-4-ethyl-hexyl) isophthalamide, a white solid having solubility properties extremely similar to those of the product in Example 1.

*Example 18*

The procedure of Example 1 is repeated substituting 6.2 grams (0.03 mole) of isophthaloyl chloride for the terephthaloyl chloride and 0.06 mole equivalent (10.3 grams) of 3,5-dimethyl-5-ethyl-3-amino-heptane for the "Primene" 81–R. The final product is N,N'-bis 3(3,5-dimethyl-5-ethylhexyl) isophthalamide, a white solid having solubility properties extremely similar to those of the product in Example 1.

*Example 19*

The procedure of Example 2 is repeated substituting 6.2 grams (0.03 mole) of isophthaloyl chloride for the terephthaloyl chloride and 0.06 mole equivalent (19.5 grams) of 8-heptyl-8-amino-pentadecane for the "Primene" 81-R. The final product is N,N'-bis 8(8-heptyl-pentadecyl) isophthalamide, a plastic solid having solubility properties extremely similar to those of the product in Example 2.

*Example 20*

The procedure of Example 1 is repeated substituting 6.2 grams (0.03 mole) of isophthaloyl chloride for the terephthaloyl chloride and 0.06 mole equivalent (11.1 grams) of 5-methyl-5-amino-undecane for the "Primene" 81-R. The final product is N,N'-bis 5(5-methyl-undecyl) isophthalamide, a white solid having solubility properties extremely similar to those of the product in Example 1.

*Example 21*

The procedure of Example 2 is repeated substituting 6.2 grams (0.03 mole) of isophthaloyl chloride for the terephthaloyl chloride and 0.06 mole equivalent (19.5 grams) of 4-propyl-4-amino-nondecane for the "Primene" 81-R. The final product is N,N'-bis 4(4-propyl-nondecyl) isophthalamide, a plastic solid having solubility properties extremely similar to those of the product in Example 2.

*Example 22*

The procedure of Example 1 is repeated substituting 6.2 grams (0.03 mole) of isophthaloyl chloride for the terephthaloyl chloride and 0.06 mole equivalent (16.1 grams) of 3,3,7,11,11 - pentamethyl-7-amino-tridecane for the "Primene" 81-R. The final product is N,N'-bis 7(3,3,7,11,11 - pentamethyltridecyl) isophthalamide, a white solid having solubility properties extremely similar to those of the product in Example 1.

*Example 23*

The procedure of Example 1 is repeated substituting 6.2 grams (0.03 mole) of isophthaloyl chloride for the terephthaloyl chloride and 0.06 mole equivalent (11.1 grams) of 2,3-dimethyl-2-amino-decane for the "Primene" 81-R. The final product is N,N'-bis 2(2,3-dimethyl-decyl) isophthalamide, a white solid having solubility properties extremely similar to those of the product in Example 1.

*Example 24*

The procedure of Example 1 is repeated substituting 6.2 grams (0.03 mole) of isophthaloyl chloride for the terephthaloyl chloride and 0.06 mole equivalent (16.1 grams) of 2-methyl-2-amino-heptadecane for the "Primene" 81-R. The final product is N,N'-bis 2(2-methyl-heptadecyl) isophthalamide, a white solid having solubility properties extremely similar to those of the product in Example 1.

*Example 25*

Tertiary-dodecylamine (.12 mole, 22.2 g.) is dissolved in 200 cc. methylene chloride, mixed with sodium carbonate (.12 mole, 12.8 g.) dissolved in 300 cc. water, and stirred in a Waring Blendor. With the Blendor running, terephthaloyl chloride (.06 mole, 12.2 g.) dissolved in 100 cc. methylene chloride is added, and stirring is continued for 7 minutes. Distilled water (400 cc.) is added to the mixture. The mixture is mechanically agitated, and the methylene chloride is distilled from the agitated mixture by heating on a steam table. The resulting slurry is filtered, and the solid product is washed with distilled water in the Waring Blendor. The solid product is then washed with water, acidified with HCl to a pH of 4, by means of the Waring Blendor. Washing with distilled water is continued until the wash water shows a negative test for chloride. The product is dried in an oven at 90° C. The white odorless solid product melts on a Fisher-Johns apparatus at 160–170° C. The product, di-t-dodecyl terephthalamide is soluble in all proportions in petroleum naphtha, aromatic hydrocarbons, and most polar solvents. Determination of nitrogen by the Kjeldahl method gives 5.50% N, as compared with a theoretical of 5.58%.

*Example 26*

11.5 grams (0.06 mole) of "Primene" 81-R, a solution of 6.4 grams (0.06 mole) of sodium carbonate in 150 cc. of water and 100 cc. of methylene chloride were charged to a one-quart Waring Blendor. With the Blendor running, a solution of 5.31 grams (0.02 mole) of trimesyl chloride dissolved in 50 cc. of methylene chloride was added to the other ingredients and the Blendor was run for 7 minutes. The reaction mixture was then mixed with 200 cc. of distilled water in a one-liter beaker. This mixture was agitated mechanically and heated on a steam bath until the methylene chloride had evaporated. The solid product was washed once in the Waring Blendor with distilled water, once with water acidified to a pH of 4 with hydrochloric acid and finally was washed with distilled water until the wash water was free of chloride as determined by the silver nitrate test. The solid yellow N-substituted t-alkyl trimesamide product was dried overnight in an oven at 70° C. The trimesamide melted at 145° C. and contained 5.86% N by Kjeldahl determination. It was soluble in all proportions in petroleum naptha and α-pinene.

*Example 27*

The procedure of Example 26 is repeated substituting 0.06 mole equivalent (10.3 grams) of 2,2,3,4,4-pentamethyl-3-amino-hexane for the "Primene" 81-R. The final product is N,N',N''-tris 3(2,2,3,4,4-pentamethyl-hexyl) trimesamide, a solid having solubility properties extremely similar to those of the product in Example 26.

*Example 28*

The procedure of Example 26 is repeated substituting 0.06 mole equivalent (17.8 grams) of 11-methyl-11-amino-nondecane for the "Primene" 81-R. The final product is N,N',N''-tris 9(9-methyl-nondecyl) trimesamide, a solid having solubility properties extremely similar to those of the product in Example 26.

*Example 29*

The procedure of Example 26 is repeated substituting 0.06 mole equivalent (11.1 grams) of 2,2,3,4-tetramethyl-4-ethyl-3-amino-hexane for the "Primene" 81-R. The final product is N,N',N''-tris 3(2,2,3,4-tetramethyl-4-ethyl-hexyl) trimesamide, a solid having solubility properties extremely similar to those of the product in Example 26.

*Example 30*

The procedure of Example 26 is repeated substituting 0.06 mole equivalent (10.3 grams) of 3,5-dimethyl-5-ethyl-3-amino-heptane for the "Primene" 81-R. The final product is N,N',N''-tris 3(3,5-dimethyl-5-ethyl-hexyl) trimesamide, a solid having solubility properties extremely similar to those of the product in Example 26.

*Example 31*

The procedure of Example 26 is repeated substituting 0.06 mole equivalent (19.5 grams) of 8-heptyl-8-amino-pentadecane for the "Primene" 81-R. The final product is N,N',N''-tris 8(8-heptyl-pentadecyl) trimesamide, a solid having solubility properties extremely similar to those of the product in Example 26.

*Example 32*

The procedure of Example 26 is repeated substituting 0.06 mole equivalent (11.1 grams) of 5-methyl-5-amino-undecane for the "Primene" 81-R. The final product is N,N',N''-tris 5(5-methyl-undecyl) trimesamide, a solid having solubility properties extremely similar to those of the product in Example 26.

*Example 33*

The procedure of Example 26 is repeated substituting 0.06 mole equivalent (19.5 grams) of 4-propyl-4-amino-nondecane for the "Primene" 81–R. The final product is N,N',N''-tris 4(4-propyl-nondecyl) trimesamide, a solid having solubility properties extremely similar to those of the product in Example 26.

*Example 34*

The procedure of Example 26 is repeated substituting 0.06 mole equivalent (16.1 grams) of 3,3,7,11,11-pentamethyl-7-amino-tridecane for the "Primene" 81–R. The final product is N,N',N''-tris 7(3,3,7,11,11-pentamethyl-tridecyl) trimesamide, a solid having solubility properties extremely similar to those of the product in Example 26.

*Example 35*

The procedure of Example 26 is repeated substituting 0.06 mole equivalent (11.1 grams) of 2,3-dimethyl-2-amino-decane for the "Primene" 81–R. The final product is N,N',N''-tris 2(2,3-dimethyl-decyl) trimesamide, a solid having solubility properties extremely similar to those of the product in Example 26.

*Example 36*

The procedure of Example 26 is repeated substituting 0.06 mole equivalent (16.1 grams) of 2-methyl-2-amino-heptadecane for the "Primene" 81–R. The final product is N,N',N''-tris 2(2-methyl-heptadecyl) trimesamide, a solid having solubility properties extremely similar to those of the product in Example 26.

According to the present invention, new N-substituted tertiary-alkyl amides of terephthalic, isophthalic, and trimesic acids are prepared by reacting a halide of the acid, such as the acid chloride, with one or more tertiary-alkyl amines having from 11 to 22 carbon atoms.

These amines belong to the general class

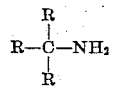

and are derivable from olefins of the class

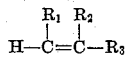

in which (1) the sum of the carbon atoms in $$[R_1+R_2+R_3]$$

is not less than 9 nor more than 20, (2) $R_1$ is H or an alkyl radical, (3) $R_2$ is an alkyl radical, and (4) $R_3$ is an alkyl radical. These olefins are converted to the tertiary-alkyl amines by reaction with hydrogen cyanide and sulfuric acid in the well-known manner as described in detail by Ritter et al. Journal American Chemical Society (volume 70, 1948), starting on page 4048, and in U.S. Patent 2,573,673, issued October 30, 1951.

The amides may be prepared from a single tertiary-alkyl amine or from a simple mixture of several such amines or from a complex mixture of a large number of such amines. The tertiary-alkyl side chains will, of course, correspond in structure to the amine starting material. If a single primary amine is used, the alkyl side chains in each molecule of the amide will be identical. If a mixture of two or three primary amines within the specified class is reacted with the acid chloride, some molecules of the amide product will have identical side chains and some will not. In such a case, the mixture of amines will react in more or less random fashion with the acid chloride groups which are present. And if the tertiary-alkyl primary amine reactant is a complex mixture of primary amines having alkyl chains of various lengths within the $C_{11}$ to $C_{22}$ range, the final product will be a correspondingly complex mixture of N-substituted amides having differing alkyl side chains, both from molecule to molecule, and within a single molecule, as is the case in Examples 1, 2, 3 and 4. It is also possible to prepare amides with tertiary-alkyl primary amines and a mixture of the acid chlorides of any of terephthalic, isophthalic, or trimesic acid in any desired proportion. All such amides and amide mixtures as are obtainable by these various reactions are contemplated as being within the scope of the present invention.

In addition to the various tertiary-alkyl amines illustrated specifically in the foregoing examples, many other tertiary-alkyl amines with alkyl chains of various lengths and configurations within the $C_{11}$ to $C_{22}$ range may be utilized, either singly or in combination, in preparing novel N-substituted amides within the scope of the invention. As noted above, the tertiary-alkyl amines which are operable for the preparation of the tertiary-alkyl amides of the present invention may be prepared from olefins by means of the Ritter reaction. There are, of course, a large number of olefins capable of undergoing the Ritter reaction for conversion to a tertiary-alkyl amine which in turn may be used for the preparation of the novel tertiary-alkyl amides. The following list of compounds represents but a few of the olefins which may be used in this connection: 2,3-dimethyl-1-decene, 2-methyl-1-nonadecene, 2-ethyl-1-decene, 3,3-dimethyl-2-isopropyl-1-hexene, 2-propyl-1-nonene, 3,3-dimethyl-2-tert-butyl-1-pentene, 3,4-dimethyl-2-tert-butyl-1-pentene, 3-ethyl-2-tert.-butyl-1-pentene, 3-methyl-2-ethyl-2-sec-butyl-1-pentene, 3-methyl-3-ethyl-2-tert-butyl-1-pentene, 3,3,4-trimethyl-2-tert-butyl-1-pentene, 3,3-dimethyl-2-tert-butyl-1-hexene, 3-methyl-2-tert-butyl-1-hexene, 3-propyl-2-tert-butyl-1-hexene, 2-butyl-1-octene, 4,4-dimethyl-2-neopentyl-1-pentene, 3,3-dimethyl-2-(1,1-dimethylpropyl)-1-pentene, 2-pentyl-1-nonene, 3,3-dimethyl-2-(1,1-dimethylbutyl)-1-hexene, 2-hexyl-1-octene, 5,9-dimethyl-2-(1,5-dimethylhexyl)-1-decene, 2-octyl-1-dodecene, 3-butyl-2-heptene, 6-methyl-3-isopentyl-2-heptene, 3,7,11,15-tetramethyl-2-hexadecene, 4-propyl-3-nonene, 7-methyl-4-propyl-3-octene, 4-propyl-3-nondecene, 2,4,4,6-tetramethyl-2-heptene,5-methyl-4-decene, 5-butyl-4-hexadecene, 2,2,3,5,5-pentamethyl-3-hexene, 2,2-dimethyl-4-ethyl-3-octene, 2,5,8-trimethyl-4-nonene, 6-ethyl-5-hendecene, 6-methyl-5-hendecene, 6-pentyl-5-hendecene, 2,2,3,5,5-pentamethyl-3-heptene, 4,8-dimethyl-4-nonene, 7-hexyl-6-tridecene, 3,5-dimethyl-5-ethyl-3-heptene, 2,2,6,10,10-pentamethyl-5-hendecene, 2,2,10,10-tetramethyl-6-(4,4-dimethylpentyl)-5-hendecene, 8-heptyl-7-pentadecene, 2,4,4,5,5-pentamethyl-2-hexene, 2,2,3,5,5,6,6-heptamethyl-3-heptene, 3,5,6-trimethyl-5-ethyl-3-heptene, 3,5-dimethyl-5-ethyl-3-octene, 2,4,4-trimethyl-2-octene, 2,4-dimethyl-2-nonene, 2,5-dimethyl-2-nonene, 5-ethyl-4-nonene, 3-methyl-3-dodecene, 3,3,7,11,11-pentamethyl-6-tridecene, 2,4,4,7-tetramethyl-2-octene, 2,5-dimethyl-2-decene, 2,3-dimethyl-3-dodecene, 4-methyl-4-tridecene, 2-methyl-2-hendecene, 2-methyl-2-heptadecene, 2-methyl-2-nonadecene, 2,3-dimethyl-1-decene, 2-methyl-1-nonadecene, 2,4,4,5,5-pentamethyl-2-hexene, 2,4,4,6-tetramethyl-2-heptene, 2,4,4-trimethyl-2-octene, 2,4,4,7-tetramethyl-2-octene, 2,4-dimethyl-2-nonene, 2,5-dimethyl-2-nonene, 2,5-dimethyl-2-decene, 2-methyl-2-hendecene, 2-methyl-2-heptadecene, 2-methyl-2-nonadecene.

The preparation of tetiary-alkyl amines from any of the foregoing as well as from other olefins and the reaction of these amines, either singly or in combination, with a trimesyl, terephthaloyl, and/or an isophthaloyl halide, is intended as falling within the scope of the present invention.

For best results in preparing the amides, the molar ratio of tertiary-alkyl primary amine per acid chloride group should be at least of 1:1.

Temperature is not generally critical to the amidation reaction by which the new compounds of the present invention are prepared, except that unusually high temperatures will tend to encourage hydrolysis of the acid chloride, for example, where the HCl acceptor is an aqueous carbonate, rather than amidation. Generally speaking, best results are achieved below about 60° C. The specific reaction medium employed will to some extent govern the temperatures used. Where methylene chloride is used for example, its boiling point of 40° C. will dictate that temperatures lower than 40° C. be used. Agitation is essential to the reaction where a heterogeneous reaction medium is used, i.e., an organic solvent for the acid chloride and an aqueous salt for an HCl acceptor.

In preparing the amides of the present invention, it is necessary to have present in the reaction mass an acid acceptor for the HCl which is evolved in the course of the reaction. An aqueous solution of an alkali metal carbonate, such as sodium carbonate, or an aqueous suspension of an alkaline earth metal carbonate is an inexpensive and satisfactory acceptor. For a non-aqueous reaction medium, a tertiary amine, such as pyridine or triethyl amine may be used or else an excess of the tertiary-alkyl primary amine reactant may be employed.

In the foregoing examples, methylene chloride was used as the reaction medium since it is a low-boiling solvent and thus easy to evaporate. However, other organic solvents for the acid chloride which are inert to the system are operable, including especially the liquid aliphatic chlorinated hydrocarbons and aromatic hydrocarbons such as benzene, toluene, etc.

As a class, the new compounds are much more resistant to oxidation than corresponding amides derived from n-alkyl primary amines. They are more nearly chemically inert with respect to reaction at the sites of the residual amido hydrogens because of the steric protection afforded by the bulky t-alkyl groups.

Animal tests indicate very low oral toxicity for the new t-alkyl amides, and patch tests on humans indicate inertness of the t-alkyl amides in their effect on human skin.

It is possible to control to some extent the physical properties of the new amides by selecting with care the tertiary-alkyl primary amine starting material. For example, the higher molecular weight amines in the $C_{11}$ to $C_{22}$ range generally result in lower melting amides, and vice versa.

The new amides of the present invention are soluble in a great many common organic solvents, as is noted above. Such solutions, when sprayed or otherwise applied to non-porous surfaces such as metals, plastics, paint, varnish, and lacquer finishes, etc. form continuous, high hydrophobic films which serve as excellent temporary protective coatings.

Numerous other uses have been found for the new amides. The new compounds having N-t-alkyl side chains in the $C_{11}$ to $C_{14}$ range are useful as hardening agents in candles when mixed in small amounts with ordinary candle wax. Similarly, the new compounds may be used in the preparation of grafting waxes as well as wax crayons and graphite pencils. They may also be used as thickening agents for water repellent greases and as lubricants for rayon yarns when applied from solvent solution.

The N-t-alkyl terephthalamides having alkyl chains in the $C_{18}$ to $C_{22}$ range may be used as a base for caulking or glazing compounds, as is illustrated by the following example:

*Example 37*

A composition consisting of the following ingredients is prepared:

| | Parts by weight |
|---|---|
| N-substituted terephthalamide product of Example 2 | 8 |
| Raw linseed oil | 1.5 |
| White mineral oil | 0.5 |
| Basic lead carbonate | 7.5 |
| Titanium dioxide | 2.5 |

The oils are blended with the molten amide at 90° C. After the addition of the oils the comopsition is easily workable at room temperature, and the inorganic fillers are blended into the soft mass at room temperature by means of a spatula. The composition has about the same consistency at this point as commercial caulking compounds. The composition is extruded onto a pine board for comparison as to weatherability with a standard commercial tube-loaded caulking compound. At the end of 1½ months' roof exposure, the amide-base composition has formed an elastic skin over the hardened, but still pliable mass. In contrast, the standard commercial caulking compound had hardened throughout and is not workable without crumbling.

The terephthalamides of the present invention having N-t-alkyl side chains in the $C_{11}$ to $C_{14}$ range have been found to be useful in improving the water resistance of sole leather as is illustrated by the following example:

*Example 38*

One-inch squares (¼" thick) of vegetable-tanned cowhide sole leather is soaked for 5 minutes in a 20% solution of the $C_{11}$–$C_{14}$ t-alkyl terephthalamide product of Example 1. The leather is removed from the solution and air dried free of solvent. The leather is thus impregnated with 4.8% of its weight of amide. The leather thus treated and untreated leather squares are soaked in water for 4 hours. The squares are then removed, the surface water dried off, and the water absorption of the leather calculated. The amide treatment described effects a 33% reduction in the water absorption of the sole leather.

The new compounds of the present invention have also been found to be useful in the preparation of adhesives, especially pressure-sensitive adhesives as is illustrated by the following example:

*Example 39*

A composition of matter is prepared by mixing together the following materials:

| | Parts by weight |
|---|---|
| $C_{18}$–$C_{22}$ t-alkyl terephthalamide product of Example 2 | 12 |
| White mineral oil | 6 |
| Polyisobutylene | 12 |
| Aliphatic petroleum naphtha | 70 |

This composition was found to be especially useful as a pressure-sensitive paper cement. The composition thus formed is a clear solution which is easily applied by brushing. After the solvent evaporates, the coating deposited on substrata such as paper or cellophane serves as an excellent pressure-sensitive adhesive.

The amides of the present invention may also be used as coating compositions for hard surfaces. The coatings may be buffed to a high gloss and offer good protection against weathering and oxidation. Examples 40 and 41 illustrate specific embodiments of such compositions.

*Example 40*

A solution is prepared by warming together two parts by weight of the $C_{11}$–$C_{14}$ t-alkyl isophthalamide of Example 4 with 2 parts of sunbleached beeswax, 24 parts of mineral spirits and 72 parts of aliphatic petroleum naphtha. As soon as the wax-like materials are in solution, the solution is cooled to room temperature. The solution is applied by means of a soft cheesecloth to a black nitrocellulose-based lacquer finish. As soon as the solvent evaporates from the coating composition on the lacquer finish, as is evidenced visually by hazing of the coating, the coating is buffed manually by means of a soft cheesecloth to an attractive lustrous, bright, water-repellent finish.

*Example 41*

The liquid composition of Example 40 is applied to a steel panel finished with baked black automotive enamel and the resulting coating is buffed. For comparison purposes, a second enameled panel is waxed with a commercially available carnauba-based automotive paste wax.

These panels are exposed on the roof of a building for six weeks during late winter. The amide composition-coated panel exhibits better water-repellency and is brighter than the commercial wax-coated panel after the weathering period.

The new amides of the present invention may also be employed to enhance the water-repellency of a wide variety of materials including, for example, shoe sole leather (see Example 38), certain textiles, etc. The following example illustrates this end-use in connection with cement-asbestos siding commonly used in the construction of residential homes.

*Example 42*

A tertiary-alkyl trimesamide composition is prepared according to the procedure of Example 26 utilizing 0.06 mole equivalents of a 75/25 mixture of "Primene" 81–R and "Primene" JM–T in lieu of the 11.5 grams of "Primene" 81–R.

An aerosol solution is prepared consisting of the following materials:

12 parts by weight of this tertiary-alkyl trimesamide composition
48 parts by weight of mineral spirits
40 parts by weight of "Freon" 12 dichlorodifluoromethane The siding used is "Century" cement-asbestos siding, white pigmented on the exposed side and silicone-treated by the original manufacturer. Segments of the siding are selected which are 4 inches by 12 inches and weigh approximately 200 grams. One segment of siding supported in a vertical position is sprayed on the white-pigmented side with the aerosol to such an extent that some of the spray "runs" on the shingle. After the solvent has evaporated by allowing the siding segment to stand overnight at room temperature, the siding surface is unchanged in color but is faintly lustrous instead of being completely flat in appearance. This amide-treated segment and a segment of similar size cut from the same sheet of siding, but untreated, are sprayed for 24 hours with cold water. At the end of the water spray treatment, surface water is wiped from the segments and the water absorption of the siding determined. The amide-treated segment absorbs 2.5% of its weight of water and is dry on the back side. The untreated segment absorbs 11.6% of its weight of water and is wet on the back side.

Having thus described my invention, I intend to be limited only by the following claims:

1. New compounds represented by the following formula:

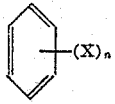

wherein "X" stands for the monovalent radical

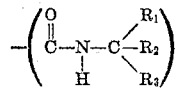

"$n$" is an integer greater than one but not greater than 3 provided that no two "X" radicals are in adjacent positions on the benzene ring; and each of $R_1$, $R_2$, and $R_3$ represent saturated alkyl groups of from 1 to 19 carbon atoms, the sum of the carbon atoms in the $R_1$, $R_2$, and $R_3$ groups of any single "X" radical being not less than 10 nor more than 21.

2. A composition of matter consisting essentially of a mixture of N-substituted amides each of the class:

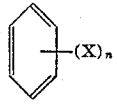

wherein "X" stands for the monovalent radical

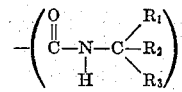

"$n$" is an integer greater than one but not greater than 3 provided that no two "X" radicals are in adjacent positions on the benzene ring; and each of $R_1$, $R_2$, and $R_3$ represent saturated alkyl groups of from 1 to 19 carbon atoms, the sum of the carbon atoms in the $R_1$, $R_2$, and $R_3$ groups of any single "X" radical being not less than 10 nor more than 21.

3. New compounds represented by the following formula:

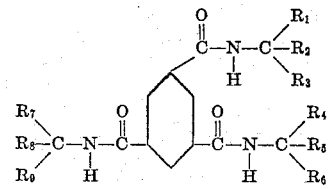

wherein each of $R_1$, $R_2$, $R_3$, $R_4$, $R_5$, $R_6$, $R_7$, $R_8$, and $R_9$ represent a saturated alkyl radical of from 1 to 19 carbon atoms, the sum of the carbon atoms in each of $[R_1+R_2+R_3]$, $[R_4+R_5+R_6]$, and $[R_7+R_8+R_9]$ being not less than 10 nor more than 21.

4. New compounds represented by the formula

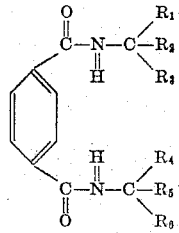

wherein each of $R_1$, $R_2$, $R_3$, $R_4$, $R_5$, and $R_6$ represent a saturated alkyl radical of from 1 to 19 carbon atoms, the sum of the carbon atoms of each of $[R_1+R_2+R_3]$ and $[R_4+R_5+R_6]$ being not less than 10 nor more than 21.

5. New compounds as in claim 4 wherein the sum of the carbon atoms in each of $[R_1+R_2+R_3]$ and $[R_4+R_5+R_6]$ is not less than 17 nor more than 21.

6. New compounds represented by the formula

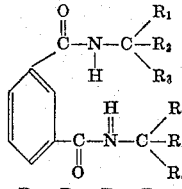

wherein each of $R_1$, $R_2$, $R_3$, $R_4$, $R_5$, and $R_6$ represent a saturated alkyl radical of from 1 to 19 carbon atoms, the sum of the carbon atoms in each of $[R_1+R_2+R_3]$ and $[R_4+R_5+R_6]$ being not less than 10 nor more than 21.

7. New compounds as in claim 6 wherein the sum of the carbon atoms in each of $[R_1+R_2+R_3]$ and $[R_4+R_5+R_6]$ is not less than 17 nor more than 21.

8. A new composition as in claim 2 in which the principal components are N,N'-tertiary, alkyl amides of terephthalic and isophthalic acids.

References Cited in the file of this patent

UNITED STATES PATENTS 2,272,466     Hummel et al.     Feb. 10, 1942

FOREIGN PATENTS 1,075,050     France     Oct. 12, 1954

OTHER REFERENCES

Wajdowa: Chemical Abstracts, vol. 34; 6707[7] (1940).
Maxim: Chemical Abstracts, vol. 22; 2153[6] (1928).